April 19, 1955  G. G. ENSIGN ET AL  2,706,380
MEAN TIME SCREW AND BALANCE ASSEMBLY AND LIKE STRUCTURE
Filed Jan. 5, 1954
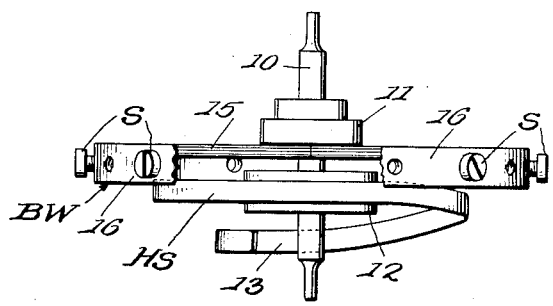
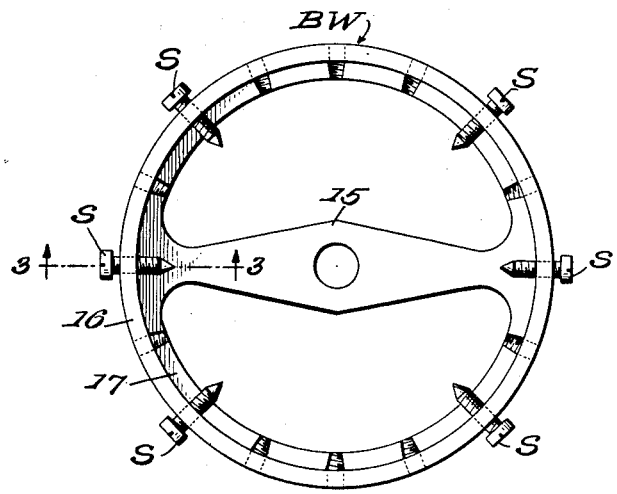
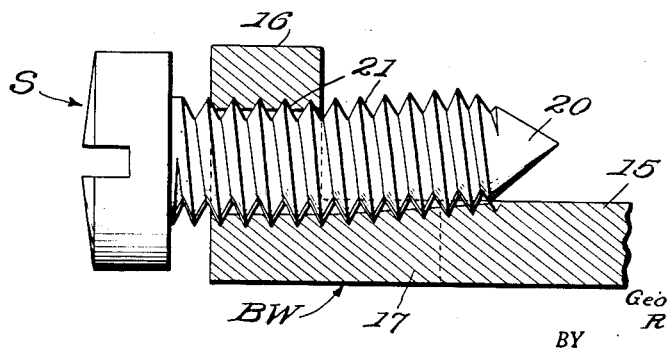
INVENTORS
George G. Ensign &
Robert C. Hoppe,
BY
Mason, Porter, Diller + Stewart,
attys.

United States Patent Office 2,706,380
Patented Apr. 19, 1955

2,706,380

MEAN TIME SCREW AND BALANCE ASSEMBLY AND LIKE STRUCTURE

George G. Ensign and Robert C. Hoppe, Elgin, Ill., assignors to Elgin National Watch Company, Elgin, Ill., a corporation of Illinois Application January 5, 1954, Serial No. 402,209

7 Claims. (Cl. 58—107)

This invention is concerned with assemblies in which a screw is to be held in various positions of axial adjustment, a typical example of practice being in the provision of adjusting screws on balance assemblies for horological instruments.

Horological instruments employing balances, are utilized for various timing operations such as in watches, clocks, timers for electrical devices, etc. A balance assembly includes a staff, a balance wheel and a hairspring. The elastic effect of the hairspring is so coordinated with the moment of inertia of the balance wheel that the assembly beats a closely controlled number of times a minute, for example 300 beats per minute, in a wrist watch. The moment of inertia of a balance wheel is dependent upon both its mass and its radius of gyration, and its beat of oscillation that will operate with a known hairspring can be regulated or controlled by varying either factor: and the elastic effect of the hairspring can be regulated or controlled by adjusting its effective length. The most commonly employed method of regulating or varying the frequency of oscillations of a balance and hairspring combination uses a regulating lever with regulator pins for engaging the hairspring at a variable distance from the outer end as a means of controlling its effective length. However, in certain high-grade watches and clocks the outer end of the hairspring is located in a fixed position with respect to its inner terminal in order to provide a spring action that will insure functioning of the oscillating elements under optimum conditions for best time-keeping. In order to maintain these conditions the length of a given hairspring must be held constant and rate adjustments to the oscillating system made by varying the moment of inertia of the balance. It is a practice with such high-grade movements to employ pairs of screws at the periphery of the balance wheel (these are sometimes called timing screws which are inserted tightly and not regulated later) and mean time screws (which may be moved in or out to accomplish minor changes of rate). In regulating the watch, pairs of timing screws are carefully weighed and used in pairs of equal weight inserted at diametrically opposing points of the balance rim for accuracy; an additional or heavier pair of screws is substituted when it is desired to increase the moment of inertia of the balance and a lighter pair of screws when it is desired to decrease this moment of inertia. Other timing means have been employed such as pairs of matched washers held by screws, pairs of eccentric weights, etc. When such timing devices are employed, it is not necessary to disturb the hairspring if originally properly dimensioned, curved, and secured in the collet and stud in order to accomplish adjustments of rate. It is also a practice in many timepiece instruments to employ such means of varying the balance moment of inertia, as have been described above, for accomplishing rate adjustments and to employ, in addition, a regulating lever system for obtaining a later regulation of the exact rate.

When pairs of mean time screws are employed for regulating the mean time of the balance assembly, they are selected of equal mass effect and are located diametrically opposite one another. They are rotated through identical angles for inward and outward adjustment, each serving to establish one half of the correction of the moment of inertia, and thus the correction is accomplished without disturbing the poise. Such mean time screws have also been employed for correcting a minor out-of-poise condition in a balance, by moving the screws in and out: one screw is moved in and the diametrically opposite screw of the pair is moved out for correcting out-of-poise conditions. Both screws are carefully moved in or out by an identical angular rotation, for regulating the watch to accurate time.

Although it is desirable to use mean time screws or similar devices on all watches because of the advantages offered, this is not done on low or medium-priced timepieces because it is too costly to employ. Such mean time screws are made for an initial tight fit in the rim holes. Even with the high-priced timepieces, the adjustments by moving the screws in and out are a fruitful source of trouble, as the threads are cut and worn after the screw has been moved a few times, resulting in a looseness between the screw and the tapped hole in the balance, wherewith the screw may shift outward as an incident of the alternating movements of and centrifugal effects in the balance wheel during the oscillations. It has been sought to correct for this by making the number of threads on the screw different from the number of threads in the tapped hole, causing a longitudinal interference and thus keeping the screw tight when moved to a new position: but this also results in a wearing and recutting, as there is essentially no elastic yielding by the amount necessary, for the reason that the amount of interference depends upon the distance by which the screw is advanced, so that it may be easy to adjust a screw inward, but the screw is loose if it is later adjusted outward. A similar blocking or locking has been attempted by making the screw slightly larger in diameter than the tapped hole, with similar difficulties. Also, a metal coating has been plated on the screw to create interference between the screw and the tapped hole, with like difficulties. Finally, viscous liquids or plastics have been employed to hold the screw tight in its adjusted position: but these require special treatment, such as heating, when an adjustment is to be made by the local watch repairman, with the probable trouble of causing a distortion in the balance wheel and often demanding that the hairspring and its collet be removed, before the operation is attempted: wherewith it is necessary to remove the entire structure from the watch before attempting the preparation for regulation.

In any event, the presently employed methods, in which an adjustment of the mean time screw is used, rather than an exchange of screws or washers of different weight, are prohibitively costly and unreliable for low-priced and medium-priced watches, and are accompanied by serious manufacturing and maintenance difficulties with high-grade watches.

According to the present invention, such adjusting screws are employed in balances by providing a structure exhibiting a resilient or elastic pressure effect upon the screw in its various possible positions of adjustment.

A feature of this invention is the provision of an arrangement for holding such screws tightly in any of various positions of adjustment.

Another feature is the provision of an arrangement by which such screws are held tightly in any of various positions of adjustment after repeated adjusting movements thereof.

A further feature is the provision of an arrangement by which the screws are held tightly in position by resilient action.

Another feature is the provision of an arrangement for holding such screws tightly in position without requiring close dimensional tolerances of cooperative parts, whereby the structure can be economically made, assembled and adjusted.

A further feature is the provision of a balance and screw assembly including a strong and rigid balance rim having holes for the screws.

With these features as objects in view, an illustrative example of practice is set out on the accompanying drawings, in which:

Fig. 1 is a side elevation of a balance assembly, with parts broken away;

Fig. 2 is a plan view of the balance wheel, viewed from the bottom of Fig. 1 with the staff and hairspring omitted;

Fig. 3 is a section, on a large scale, substantially on line 3—3 of Fig. 2.

In these figures, the balance staff 10 has a collar 11 against which is pressed the balance wheel BW. This staff 10 also receives the hairspring collet 12 on which is secured the inner end of the hairspring HS, this hairspring being illustrated with the outer end formed as a Bréguet over-coil 13. In Fig. 1, the balance wheel BW is shown as having mean time screws S each having its axis in the radial direction relative to the axis of the staff 10.

As shown in Fig. 2, one pair of diametrically opposed screws S are located in alignment with the spoke portion 15 of the balance wheel BW which has a periphery formed with an axial flange portion 16 and a radial flange portion 17, this radial flange portion being shown in Figs. 2 and 3 as having the same upper and lower planes as the spoke portion 15. It will, however, be understood that it is unnecessary to the invention, when employing a single pair of mean time screw, to have this radial flange portion 17 extended between the ends of the spoke portion 15.

Radial holes are drilled through the axial flange portion 16, the axes of the holes being in the illustrated preferred form above the upper plane of the spoke portion 15 and the radial flange portion 17, and the diameter of the holes being such that after the drill penetrates the axial flange portion 16, a partial cut or groove is formed in the spoke portion 15 or the radial flange portion 17. Thus apertures are provided which are each formed partly as a hole through the axial flange portion 16, and partly as a groove on a surface of the radial flange portion 17 or the spoke portion 15. The radial flange presents a relatively axial surface on the balance rim which is thus geometrically intersected by the prolonged cylinder of the hole which in turn intersects the junction of the two flanges in the illustrated form, with parts of the radial flange surface at the hole being located relatively between the axis of the portion of the hole in the axial flange and the extension of the cylindrical surface in which is located the bottoms of the thread grooves into which the screw is first introduced. The apertures are then threaded by a tap having a tapered end. Thus, the cut threads are essentially a cylindrical helix in the hole in the axial flange 16; but the continuation of the threads at the end of the groove formed in the spoke portion 15 or the radial flange portion 17 is tapered in the illustrated embodiment so that the threaded grooves on the upper face of the spoke portion 15 in Fig. 3, for example, are of decreasing depth or distance from the axis of the hole. Thus the surface of the hole at its inner end, being the end near the balance axis, is at a lesser distance from the prolongation of the hole axis than at its outer end, being the end where the groove is alined with the hole in the axial flange portion 16, that is, such part of the groove is nearer the prolongation of the axis of the hole than the hole radius.

In Fig. 2, three pairs of mean time screws S are shown, in three pairs of diametrically opposite screw members, the holes for each of these screws extending through the axial flange portion 16, and being tapped so that the taper threads are formed on the spoke portion 15 or the connecting radial flange portion 17.

The mean time screws are shown in enlarged view in Fig. 3 as formed with conical ends 20, but for the major portion of their lengths being provided with a cylindrical helical thread 21 which has a smoothly running fit in the tapped hole in the flange portion 16, but is not a force or driving fit therein. These screws have greater lengths than the usual time screws, and their total masses are so computed relative to the balance wheels of maximum and minimum moments of inertia that a balance wheel having a minimum moment of inertia can be brought to proper rate with all six screws of Fig. 2, in their outermost positions, with one or more turns only engaged with the tapered portion of the screw thread formed in the upper surface of the spoke portion 15 or the radial flange 17. On the other hand, with a balance wheel of maximum moment of inertia, the mean time screws have essentially their entire lengths in the tapped holes and the heads are at the outer surface of the axial flange portion 16.

One or both of the cooperating members is formed of resilient material, so that there is relative elastic yielding of the parts as the time screws S are screwed in and engaged with the tapered inner ends of the channels provided for them; and therewith the screws are caused to elastically bend or arch for significant parts of their lengths. For example, the balance wheel may be made of beryllium copper or hard brass, in conjunction with time screws S made of the same or a heavier and stiffer metal coated with non-corrosive material.

With the foregoing structure, and with employment of balance wheels BW which have been brought to essentially poised condition and within a pre-selected range of moments of inertia, and with hairsprings which have been independently rated to essentially uniform pre-selected elastic effort, within known tolerances, the watch may be assembled, or the hairspring portions thereof assembled to the pillar plate and balance cock, and the hairspring fastened in its stud. In a preferred practice, the mean time screws S are introduced until the screw heads touch the rim: that is, a minimum moment of inertia is provided for the balance assembly. The rate of the watch can now be determined by the operator by any of the means known to the expert in the art, so that he learns that the rate is fast by a certain determined amount. This amount can then be computed as demanding a certain change in moment of inertia, or, more directly, as requiring that each mean time screw be withdrawn by a certain number of complete turns plus a fraction. The operator can then withdraw each of the mean time screws by this number of turns, plus fractional turns, and again determine the rate and make minor readjustment. In this fashion, the watch can be brought accurately to time, without demanding any regulator on the balance cock, and permitting the use of hairsprings with over-coils.

It will be noted that these screws do not demand extremely close tolerances, as would be the case when a jamming action is required between a cylindrical screw and a threaded hole having helical cylindrical threads. The elastic yielding of parts permits essentially uniform pressure to be exerted upon the screw thread and screw, with reduction or elimination of wear upon the threads of the balance hole and of the screw. A sufficient regulating range is feasible with standardized mean time screws for the particular balance assemblies, so that the pretiming of the balance wheels and predetermination of the length of the hairsprings becomes less costly. It is possible for the local repairman to make changes in the rating of the watch, without altering the poise of the balance and indeed without removing the parts from the watch.

While the presence of the full radial flange 17 is not necessary for the practice of the invention, as a single pair of screws S may be employed in diametrically opposed relation at ends of the diameter represented by the spoke portion 15, it is preferred to have the structure include the radial flange 17 and to employ several pairs of opposed time screws, for example the three pairs shown in Fig. 2: as the balance rim structure is stronger and less subject to distortions from machining operations and handling, and the presence of the greater number of screws enables a greater range of adjustment to be accomplished without demanding large and heavy screws.

It is obvious that the invention is not limited to the form of construction and employment shown, and that it may be practiced in many ways within the scope of the appended claims.

We claim:

1. A screw and balance assembly, comprising a balance member and a screw member; characterized in that the balance member has a peripheral wall portion with a screw-threaded hole substantially radial relative to the balance axis, and also has a portion projecting inward from said peripheral wall portion toward the balance axis, said projecting portion having a groove extending from the hole and forming a continuation thereof, said groove at a part nearer the balance axis than said peripheral wall portion having its defining surface nearer the prolongation of the hole axis than the radius of the hole; the screw member having a thread fitting the screw thread in the hole, and having its end near the balance axis engaged with said part of the groove wherewith the said end of the screw is in a tilted position relative to the hole axis; at least one of said members being of resilient material.

2. A screw and balance assembly, comprising a balance member and a pair of screw members; characterized in that the balance member has diametrically opposed peripheral wall portions each with a screw-threaded hole substantially radial relative to the balance axis, and also has portions adjacent said holes projecting inward from said peripheral wall portion toward the balance axis, each said projecting portion having a groove extending from the respective hole and forming a continuation thereof, each said groove at a part nearer the balance axis than the respective said peripheral wall portion having its defining surface nearer the prolongation of the respective hole axis than the radius of the hole; each screw member having a thread fitting the screw thread in a respective hole, and having its end near the balance axis engaged with said part of the respective groove wherewith the said end of the screw is in a tilted position relative to the respective hole axis; at least one of said members being of resilient material.

3. A screw and balance assembly, comprising a balance member and screw members; characterized in that the balance member has a periphery including an axial flange and a radial flange, the radial flange extending from the axial flange toward the balance axis, with screw-threaded holes in the axial flange substantially radial relative to the balance axis, said radial flange having threaded grooves extending from the holes and forming continuations thereof, each said groove at a part nearer the balance axis than said axial flange having its defining surface nearer the prolongation of the respective hole axis than the radius of the hole; the screw members having threads fitting the screw threads in the holes, and having their ends near the balance axis engaged with said parts of the grooves wherewith the said ends of the screws are in a tilted position relative to the hole axis; at least one of said members being of resilient material.

4. A screw and balance assembly, comprising a balance member and a screw member; characterized in that the balance member has a periphery including axial and radial flange portions, the radial flange portion extending inward from the axial flange portion toward the balance axis, with an aperture formed as a hole through the axial flange portion and continued as a groove in the radial flange portion, the aperture being substantially radial relative to the balance axis, the wall of the hole having a screw thread which continues on the groove surface with its distance from the prolonged hole axis decreasing toward the balance axis; said screw member having a thread fitting the screw thread in said hole and groove and effective in said threaded groove to produce a relative tilting movement of the axis of the screw member; at least one of said members being of resilient material.

5. A screw and balance assembly, comprising a balance member and a pair of screw members; characterized in that the balance member has a peripheral wall portion and a diametrical spoke portion with screw-threaded holes in the peripheral wall portion substantially radial relative to the balance axis, said spoke portion having grooves at its ends extending from the respective holes and forming continuations thereof, each said groove at a part nearer the balance axis than said peripheral wall portion having its defining surface nearer the prolongation of the hole axis than the radius of the hole; the screw members having threads fitting the screw threads in the holes, and having their end near the balance axis engaged with said parts of the grooves wherewith the said ends of the screws are in a tilted position relative to the respective hole axis; at least one of said members being of resilient material.

6. A mean time screw and balance assembly for a horological device, comprising a balance member and pairs of screw members; characterized in that the balance member has a periphery including axial and radial flange portions, the radial flange portion extending from the axial flange portion toward the balance axis, and also has a diametrical spoke portion connecting opposite parts of the radial flange portions, said axial flange portion having holes in diametrically opposed pairs, said radial flange portion having grooves extending from respective holes and forming continuations thereof, each said groove at a part nearer the balance axis than said axial flange portion having its defining surface nearer the prolongation of the respective hole axis than the radius of the hole, the walls of said holes and grooves having screw threads; the screw members having threads fitting the screw threads in the holes, and having their ends near the balance axis engaged with said parts of the grooves wherewith the said ends of the screws are in a tilted position relative to the respective hole axis; at least one of said members being of resilient material.

7. A mean time screw and balance assembly for a horological device, comprising a balance member having a periphery including axial and radial flange portions and a spoke portion, the radial flange portion and the ends of the spoke portion extending continuously for the periphery of the balance member, and a hole extending through the axial flange portion and in part intersecting a part of the radial flange portion, the wall of said hole having a screw thread which continues onto the radial flange portion with a threaded groove of decreasing depth; and a screw member having a thread of cylindrical helical form fitting the screw thread of said hole and effective in said thread groove to produce a relative tilting of the axis of the screw member in the hole; said screw member being of resilient material.

References Cited in the file of this patent

UNITED STATES PATENTS

| | | |
|---|---|---|
| 397,103 | Allen et al. | Feb. 5, 1889 |
| 2,180,773 | Simpson | Nov. 21, 1939 |
| 2,390,662 | Perry | Dec. 11, 1945 |
| 2,544,306 | Fleck | Mar. 6, 1951 |